Dec. 11, 1956  H. I. CHAMBERS  2,773,712
WINDSHIELD WIPER ARM DRIVING MEANS
Filed Dec. 31, 1952

INVENTOR.
Herbert I. Chambers
BY

United States Patent Office 2,773,712
Patented Dec. 11, 1956

2,773,712

WINDSHIELD WIPER ARM DRIVING MEANS

Herbert I. Chambers, Toledo, Ohio

Application December 31, 1952, Serial No. 328,997

1 Claim. (Cl. 287—53)

This invention relates to windshield wiper arms, more particularly to an adjustable attachment means between the arm and a rotatable driving shaft.

In modern automobiles, it is essential that the sweep of the windshield wiper blades begin at a predetermined point and sweep over a uniform angle over the glass, otherwise an unsightly condition arises which is not desirable for the driver. To attain this uniformity of sweep of the wiper blade, an adjustment must be provided which is capable of being adjusted exactly at the desired position and then pulled down to final driving relation by means of a securing means. Infinite adjustment of position is needed for this purpose as distinguished over the prior art which allowed adjustment over a minimum angle which, in some instances, was about five degrees of rotation, so that exact adjustment could not always be obtained. The present invention contemplates the provision of an adjustment which can be varied infinitely to give an exact relation between a pair of cooperating wiper arms and also between the wiper arms and the windshield edges.

It is, therefore, a principal object of this invention to provide an adjustable windshield wiper arm attachment means for connection to a driven shaft which is capable of infinite angular adjustment.

It is a further object of this invention to provide an adjustable windshield wiper arm which is suitable for fabrication on a mass production line at the lowest costs with a pleasing contour for aesthetic purposes.

Other objects and advantages of this invention relating to the arrangement, operation and function of the related elements of the structure, to various details of construction, to combinations of parts and to economies of manufacture, will be apparent to those skilled in the art upon consideration of the following description and appended claim, reference being had to the accompanying drawings forming a part of this specification wherein like reference characters designate corresponding parts in the several views.

Referring to the drawings.

Figure 3:
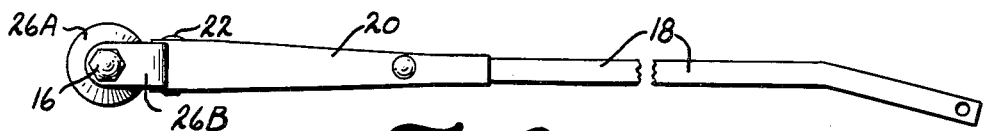
Fig. 3 is a plan view of Fig. 2.
Figure 2:
Fig. 2 is an elevational view of the same arm.
Figure 1:
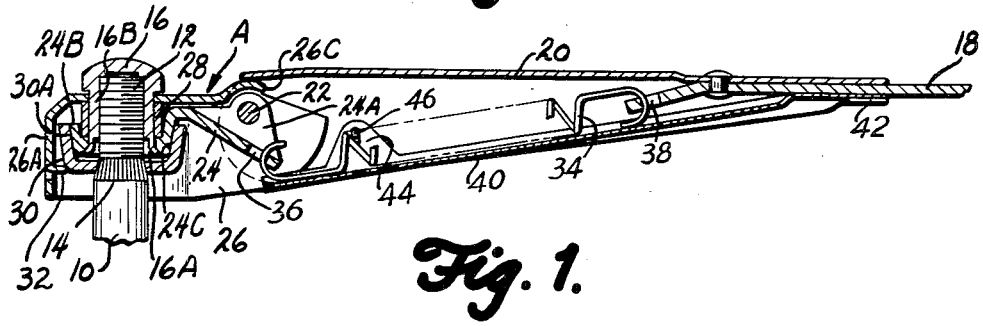
Fig. 1 is a sectional elevational view of an arm incorporating the invention.

Turning now to the drawings, particularly to Fig. 1, a rotatable driving shaft 10 is provided which is adapted to be oscillated through a predetermined driving angle by an apparatus (not shown) which may be electric or vacuum or any other suitable type as is well known in the art. The shaft 10 is provided with a threaded terminus 12 on an attenuated portion positioned above a conical serrated shoulder 14 on which the arm A is clamped by a nut 16 engaging with the threaded terminus 12 to be further described hereinafter.

The arm A comprises generally of an elongated portion 18 having at its distal end provision whereby a wiper blade (not shown) may be attached as disclosed in Serial No. 231,291 while at its proximate end, a channel-shaped housing member 20 is provided, into which is riveted the elongated portion as shown. The channel-shaped housing member is pivoted at its end to a pair of members by means of a transverse rivet 22, which fits into aligning holes in the housing member, the driven member 24 and the shroud 26, the shroud nesting into the channel-shaped housing member, and the driven member nesting in the shroud.

The shroud 26 comprises a cup-shaped portion 26A concentric with the shaft 10 which projects through an aperture in its bottom, and having a lateral projection 26B which nests into the end of the member 20, through the sides of which the rivet 22 is fitted, as already described. The end of the web of the projection 26B is provided with a small cylindrical section 26C (Fig. 1) concentric with the rivet 22 which cooperates with the web of the member 20 to provide a neat sliding fit between the member when pivoting of the member 20 about the rivet 22 occurs. The side members of the lateral projection project substantially beyond the cylindrical section 26C to contact the sides of the member 20 to give greater strength to the arm during oscillation by the shaft 10.

The driven member 24 is made of substantially heavier material than either the channel member 20 or the shroud 26, and is provided with upstanding ears 24A pierced by holes, into which the rivet or pivot pin 22 is fitted to form a driving and pivoting relation with the parts. The web portion or arm between the ears 24A extends obliquely upwardly to adjacent the upper portion of the shroud 26 where it is provided with a depending cup-shaped member 24B whose outer surface 24C is given a taper of approximately 9 degrees. The bottom of the cup-shaped member 24B is pierced with an aperture concentric with the shaft 10 and its own lip, into which is fitted an outwardly peened flange 16A on the terminus of a depending tubular portion 16B of the nut 16. A spacer tube 28 is provided between the bottom of the cup-shaped member 24B and the lower surface of the shroud 26 concentric the shaft 10, and embracing the tubular portion 16B of the nut 16, so that the nut 16, when pulled down on the threaded portion of the shaft 10, applies pressure to the upper surface of the shroud 26, which is then transmitted by the tube 28 to the member 24B for purposes to be described further hereinafter.

The tapered cup-shaped member 24B is fitted into a driving cup member 30, whose inner surface 30A is given the same taper as the outer tapered surface 24C of the member 24B, so that, when pressed together, these two members will lock to form an adjustable driving relation. The cup member 30 is loosely held within the shroud 26A by inwardly struck lugs 32, three being provided approximately 120° apart on the flange of the shroud, which contact the driving member 30 as shown, so as to make the arm a complete assembly including the nut 16 and is adapted to be sold in a separate package as a replacement unit. The driving cup 30 has its bottom perforated by a serrated aperture which, when hardened, will grip the serrated shoulder 14 of the driving shaft 10 to form a driving relation therewith when pulled down thereagainst by the nut 16. The shaft 10 drives the cup member 30 by the interfitting serrations, while the cup member 30 drives through the adjustable relation of the interfitting tapered surface the driven member 24 which supports the arm as a whole.

When an adjustment of the angular relation between arm A and shaft 10 is desired, the operator backs away the nut 16 by a suitable tool, whereby the flange 16A pulls upwardly on the inner cup member 24B to break the locking relation between the tapered surfaces, so that rotation may occur between the two cup-shaped members 24B and 30. The cup 30 will retain its relative position with the serrated shoulder 14 of the shaft 10 during these operations, due to the high friction and biting relation between the hardened serrations on both parts. When the arm A is turned to the adjusted position desired, the nut 16 is again drawn down and the tapered surfaces relock to form the driving relation anew. The fact that the adjustment is made between these tapered locking surfaces, allows an infinite angular adjustment to be made.

A tension spring 34 is provided for rotating the arm toward the windshield being anchored in an aperture 36 in the forward end of the member 24 and affixed at the other end in an aperture 38 in the bent end of the main arm member 18. A protective cover 40 is provided for the spring being clamped at the distal end in the bent-over flanges 42 of the channel 20, while its proximate end is provided with upwardly bent side members 44 which are held in position in the channel 20 by detents 46 in the sides thereof.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claim beyond the requirements of the prior art.

What is claimed is:

In a device of the class described, an arm assembly for a windshield wiper blade comprising, a cup-shaped driving member interlocked in a driving relation to an oscillatable shaft, said member having a smooth conical tapering surface of approximately nine degrees concentric with the shaft, a cup-shaped driven member also having a smooth conical tapering surface of substantially the same taper adapted to nest with the driving member so that when they are tightly clamped together they form a driving connection between them solely by the frictional engagement between the smooth nesting surfaces, a laterally-extending arm on the driven member, an outer shroud member covering the elements and attached to the arm of the driven member by a pivot pin positioned at a point displaced from the axis of the shaft, a pressure nut threaded to the shaft including a depending tubular portion terminating in an externally extending flange to rotatably secure it to the driven member and the shroud member, a tubular member between the shroud member and the driven member positioned around the depending tubular portion of the nut for transferring the force for clamping the parts having the tapered surfaces together to form the driving connection between them and to hold the driving member in its interlocking relation with the shaft, and inturned spaced lugs on the shroud member to underlie the driving member to prevent complete disengagement of the driving and driven members whereby the parts are maintained as an assembly when disengaged from the shaft.

References Cited in the file of this patent

UNITED STATES PATENTS

| | | |
|---|---|---|
| 2,215,371 | Horton | Sept. 17, 1940 |
| 2,317,245 | Bell | Apr. 20, 1943 |
| 2,417,991 | Nesson | Mar. 25, 1947 |
| 2,442,697 | Krohm | June 1, 1948 |
| 2,449,357 | Zaiger | Sept. 14, 1948 |
| 2,499,809 | Zaiger | Mar. 7, 1950 |

FOREIGN PATENTS

| | | |
|---|---|---|
| 497,027 | Great Britain | Dec. 12, 1938 |